(12) United States Patent
Arai

(10) Patent No.: US 11,831,853 B2
(45) Date of Patent: Nov. 28, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomoaki Arai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/502,383

(22) Filed: Oct. 15, 2021

(65) Prior Publication Data

US 2022/0141440 A1     May 5, 2022

(30) Foreign Application Priority Data

Nov. 2, 2020   (JP) ................. 2020-183778

(51) Int. Cl.
*H04N 13/117*     (2018.01)
*H04N 13/398*     (2018.01)
*H04N 13/332*     (2018.01)
*H04N 13/383*     (2018.01)

(52) U.S. Cl.
CPC ........ *H04N 13/117* (2018.05); *H04N 13/332* (2018.05); *H04N 13/383* (2018.05); *H04N 13/398* (2018.05)

(58) Field of Classification Search
CPC .. H04N 13/117; H04N 13/332; H04N 13/383; H04N 13/398; H04N 5/232; H04N 5/247; H04N 21/21805; H04N 21/41407; G06F 3/011

USPC .......................................................... 348/53
See application file for complete search history.

(56) References Cited

U.S. PATENT DOCUMENTS

| | | | |
|---|---|---|---|
| 11,006,089 B2 | 5/2021 | Arai | |
| 2003/0098863 A1* | 5/2003 | Fujita | G06T 15/20 345/419 |
| 2018/0288394 A1* | 10/2018 | Aizawa | H04N 5/2628 |
| 2019/0043245 A1* | 2/2019 | Ogata | H04N 7/14 |
| 2019/0199992 A1* | 6/2019 | Shikata | G06T 7/70 |
| 2020/0234495 A1* | 7/2020 | Nakao | G06T 15/20 |
| 2020/0265633 A1* | 8/2020 | Okutani | G06F 3/012 |
| 2022/0092846 A1* | 3/2022 | Monti | A63F 13/26 |
| 2022/0147138 A1* | 5/2022 | Muramoto | G02B 27/017 |

FOREIGN PATENT DOCUMENTS

JP     2011-151446 A     8/2011

* cited by examiner

*Primary Examiner* — Gims S Philippe
(74) *Attorney, Agent, or Firm* — Carter, DeLuca & Farrell LLP

(57) ABSTRACT

The information processing apparatus includes: one or more processors functioning by executing instructions stored in one or more memories as the following units: an obtaining unit configured to obtain information for specifying a display device that displays a virtual viewpoint image whose virtual viewpoint can be changed; and a determining unit configured to determine a virtual viewpoint position in accordance with a display device specified based on information obtained by the obtaining unit.

17 Claims, 12 Drawing Sheets

| TIME INFORMATION | POSITION INFORMATION | ORIENTATION INFORMATION (PAN, TILT, ROLL) |
|---|---|---|
| HH.MM.SS.FF | (x,y,z) | (P,T,R) |

FIG.6

| TERMINAL DEVICE NAME | HEAD-MOUNTED DISPLAY |
|---|---|
| TERMINAL DEVICE ID | HMD123456 |

FIG.7

| TIME INFORMATION | POSITION INFORMATION | | | |
| --- | --- | --- | --- | --- |
| | BALL(ID = B01) | PLAYER 01(ID = P01) | PLAYER 02(ID = P02) | PLAYER 03(ID = P03) |
| HH.MM.SS.FF | (x,y,z) | (x,y,z) | (x,y,z) | (x,y,z) |
| HH.MM.SS.FF | (x,y,z) | (x,y,z) | (x,y,z) | (x,y,z) |
| HH.MM.SS.FF | (x,y,z) | (x,y,z) | (x,y,z) | (x,y,z) |
| HH.MM.SS.FF | (x,y,z) | (x,y,z) | (x,y,z) | (x,y,z) |
| ⋮ | ⋮ | ⋮ | ⋮ | ⋮ |

FIG.8

INFORMATION PROCESSING APPARATUS, INFORMATION PROCESSING METHOD, AND STORAGE MEDIUM

FIELD

The present disclosure relates to a technique to generate a virtual viewpoint image.

DESCRIPTION OF THE RELATED ART

A technique has been attracting attention, which performs synchronous image capturing by installing a plurality of imaging apparatuses at different positions and generates a virtual viewpoint image in accordance with a virtual viewpoint designated arbitrarily by using a multi-viewpoint image obtained by the image capturing. In a server using the virtual viewpoint image such as this, it is possible to view a specific scene (for example, a goal scene and the like) in, for example, soccer, basketball and the like, and therefore, it is possible to give a high feeling of being at a live performance to a user compared to a conventional captured image.

An image processing apparatus, such as a server, which provides the service such as this, aggregates images obtained by capturing a specific position (area) within an image capturing-target space with a plurality of imaging apparatuses, performs processing, such as generation of three-dimensional shape data and rendering, and transmits the generated virtual viewpoint image to a user terminal. Due to this, it is possible to implement generation and viewing/browsing of a virtual viewpoint image based on a multi-viewpoint image.

Japanese Patent Laid-Open No. 2011-151446 has disclosed a technique to display a combined image in a case where a vehicle is viewed from a virtual viewpoint, which is displayed on a display device, and a model image indicating the virtual viewpoint position and the range of the field of view by switching them to those after the change upon receipt of a user operation to change the virtual viewpoint position.

SUMMARY

In a case where a virtual viewpoint image is viewed, a variety of kinds of device may be used. For example, a device, such as a stationary display, a mobile terminal, such as a smartphone and a tablet terminal, a head-mounted display (in the following, also referred to as HMD), and a table-type display, may be used to view a virtual viewpoint image. In a case where the various devices may be used as described above, depending on the terminal that is used, there is a possibility that a virtual viewpoint image different from a virtual viewpoint image desired by a user is displayed.

In view of the above-described problem, the present disclosure provides a technique to display a virtual viewpoint image suitable to a viewing device.

The information processing apparatus according to one embodiment of the present disclosure is an information processing apparatus including: one or more processors functioning by executing instructions stored in one or more memories as the following units: an obtaining unit configured to obtain information for specifying a display device that displays a virtual viewpoint image whose virtual viewpoint can be changed; and a determining unit configured to determine a virtual viewpoint position in accordance with a display device specified based on information obtained by the obtaining unit.

Further features of the present disclosure will become apparent from the following description of exemplary embodiments with reference to the attached drawings.

BRIEF DESCRIPTION OF THE DRAWINGS

FIG. 6 is a diagram showing a virtual viewpoint parameter example;

FIG. 7 is a diagram showing a terminal information example;

FIG. 8 is a diagram showing a metadata example;

DESCRIPTION OF THE EMBODIMENTS

In the following, the present embodiment is explained with reference to the drawings. The following embodiment is not necessarily intended to limit the present disclosure. Further, all combinations of features explained in the present embodiment are not necessarily indispensable to the solution of the present disclosure.

First Embodiment (System configuration)

Figure 1:
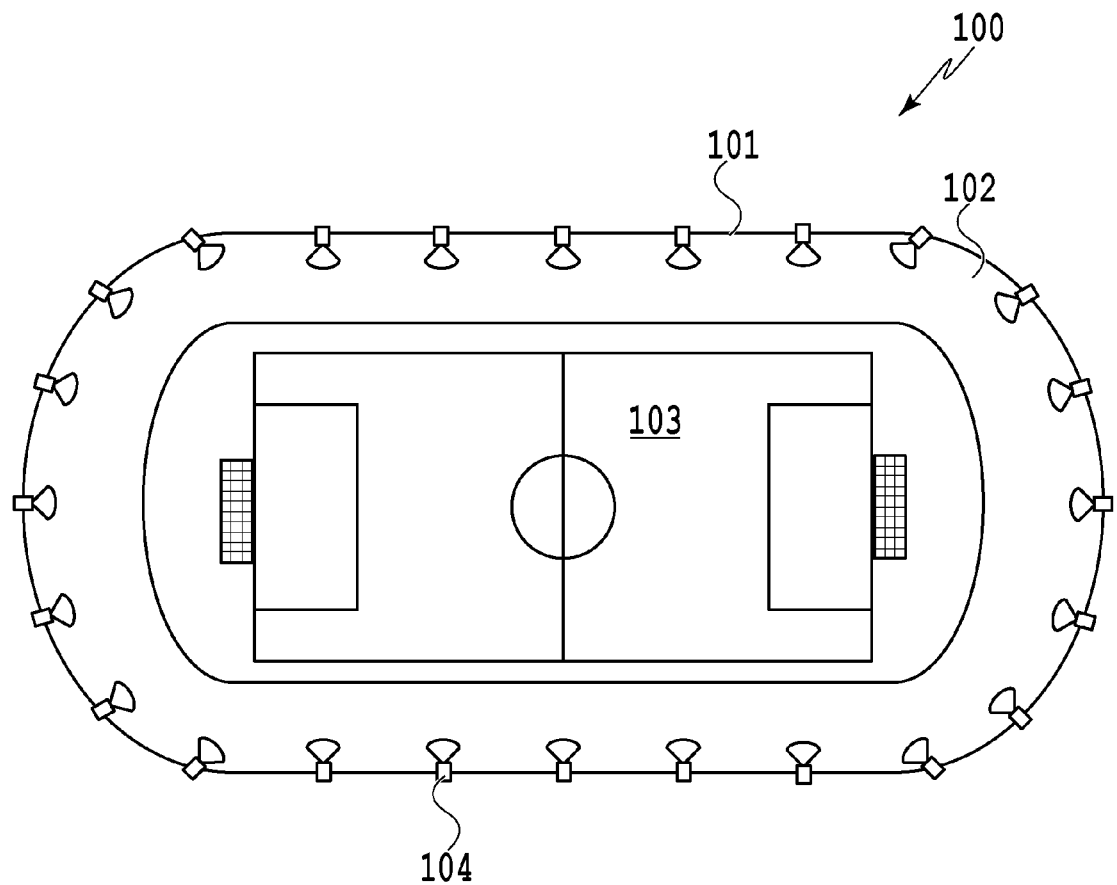
FIG. 1 is a diagram showing an outline of an image processing system.

An outline of an image processing system according to the present embodiment is explained with reference to the drawing. FIG. 1 is a diagram showing an outline example of an image processing system according to the present embodiment. As shown in FIG. 1, an image processing system 100 has a plurality of imaging apparatuses 104 installed in a stadium 101, such as a soccer stadium. The stadium 101 includes a field 103 on which a game or the like is actually played and a spectator stand 102 surrounding the field. The plurality of the imaging apparatuses 104 is arranged so as to surround the spectator stand 102 and the field 103.

Figure 2:
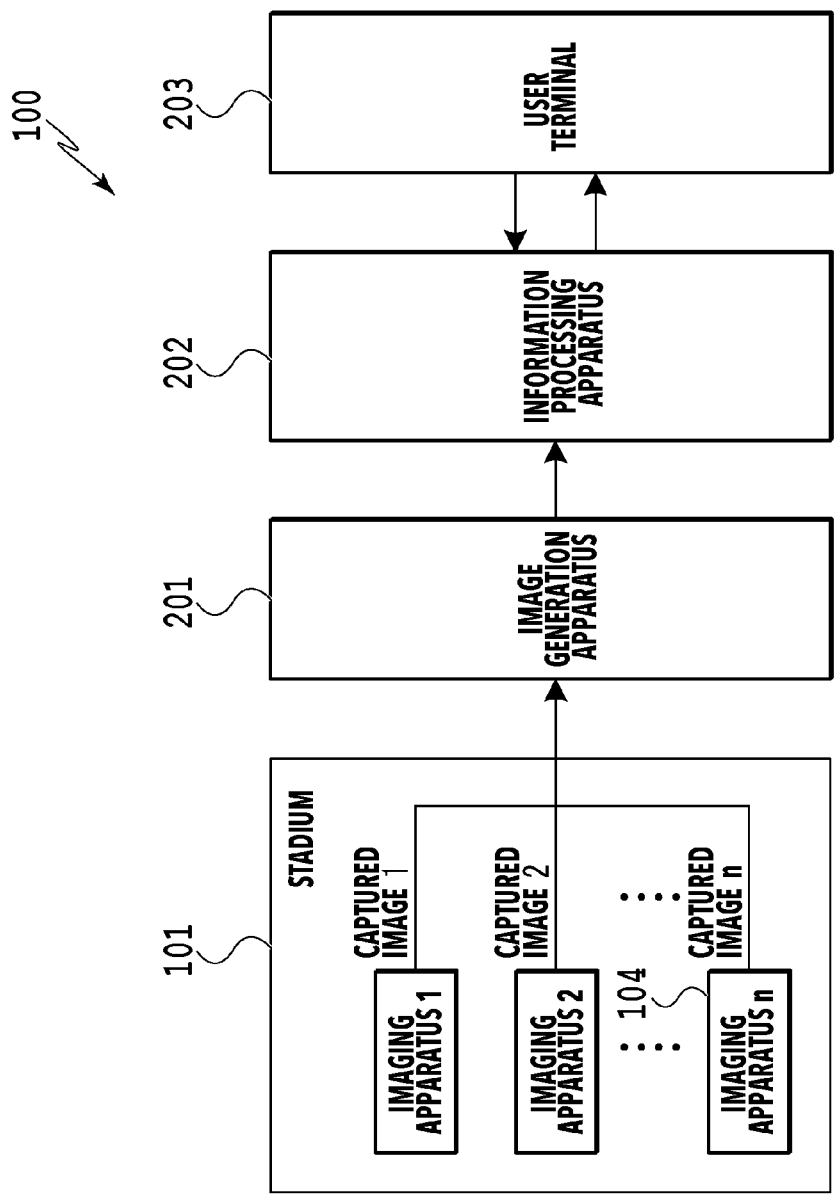
FIG. 2 is a diagram showing a configuration example of the image processing system.

Following the above, a configuration example of the image processing system is explained by using the drawing. FIG. 2 is a diagram showing a configuration example of the image processing system 100. As shown in FIG. 2, the image processing system 100 has the plurality of the imaging apparatuses 104 installed in the stadium 101, an image generation apparatus 201, an information processing apparatus 202, and a user terminal 203.

Each of the plurality of the imaging apparatuses 104 is arranged so as to capture at least part or the entire range of the field 103, which is the image capturing-target area, and cause the viewing angles of at least the two imaging apparatuses to overlap, and is connected to one another via, for example, a transmission cable. Further, the imaging apparatuses 104 are installed so as to face the gaze point or the gaze points of one or a plurality of real cameras set in advance. That is, the gaze point or each of the gaze points of the one or the plurality of real cameras are captured from different directions by the two or more imaging apparatuses 104. The plurality of the imaging apparatuses 104 is also connected to the image generation apparatus 201 and transmits the image obtained by capturing the field 103 to the image generation apparatus 201.

The plurality of the imaging apparatuses 104 may be imaging apparatuses that capture a still image, imaging apparatuses that capture a moving image, or imaging apparatuses that capture both a still image and a moving image. In the present embodiment, unless specified particularly, the term "image" includes the concepts of both a still image and a moving image.

The image generation apparatus 201 is an apparatus that generates a virtual viewpoint image. The virtual viewpoint image in the present embodiment is also called a free-viewpoint image and an image corresponding to a viewpoint designated freely (arbitrarily) by a user. Note that the virtual viewpoint image is not limited to this and, for example, an image corresponding to a viewpoint selected by a user from among a plurality of candidates is also included in the virtual viewpoint image. Further, in the present embodiment, although explanation is given by focusing attention on a case where the virtual viewpoint image is a moving image, the virtual viewpoint image may be a still image. Further, designation of a virtual viewpoint may be performed by a user operation or may be performed automatically by an apparatus. In the present embodiment, an example is explained in which an information processing apparatus, to be described later, determines a virtual viewpoint.

Further, as the method that is explained in the present embodiment, a method is explained in which an appropriate virtual viewpoint image is displayed in accordance with a terminal (device) that is used to view a virtual viewpoint image. For example, in a case where a user uses an HMD (Head-Mounted Display), the user views a virtual viewpoint image displayed on a small-size display of the HMD in the state where the small-size display is arranged in front of both eyes of the user. At this time, in a case where a virtual viewpoint image corresponding to a viewpoint of a player playing soccer on the field, a viewpoint of a virtual person standing on the field, and the like is displayed on the small-size display of the HMD, it is possible for the user mounting the HMD to experience virtual reality with the line-of-sight of the person. Further, in a case where a user displays a virtual viewpoint image by using a table-type display, it is considered that, for example, the number of times a virtual viewpoint image in which the entire field is viewed from a bird's eye is displayed increases. As described above, it is considered that the virtual viewpoint image that is desired to be displayed is different for different kinds of terminal.

Consequently, in a case where the same virtual viewpoint image is displayed at all times irrespective of the king of terminal, there is a possibility that a virtual viewpoint image desired by a user is not displayed. For example, in a case where an image in which the entire field is viewed from a bird's eye is displayed at the time of displaying a virtual viewpoint image by using the HMD, there is a possibility that the image is different from that desired by a user. Of course, although the virtual viewpoint position and the line-of-sight direction may be changed by a user operation after the virtual viewpoint image is displayed, there is a possibility that the load of the operation by a user is heavy. In the present embodiment, a method of solving the problem such as this is explained.

The image generation apparatus 201 stores a plurality of images (in the following, there is a case where an image that is captured is called "captured image") obtained by a plurality of imaging apparatuses performing image capturing and generates a virtual viewpoint image group using the plurality of stored images. The virtual viewpoint image group is a set of virtual viewpoint images corresponding to different virtual viewpoints. The image generation apparatus 201 transmits the generated virtual viewpoint image group and metadata to the information processing apparatus 202. The metadata is position information indicating the position of a player playing on the field 103, and the like. The image generation apparatus 201 is, for example, a server apparatus and has a function as a database that stores a plurality of captured images and the generated virtual viewpoint image group, in addition to an image processing function for generating a virtual viewpoint image. In addition, the plurality of the imaging apparatuses 104 within the stadium 101 and the image generation apparatus 201 are connected by a wired or wireless communication network line or a cable line, such as SDI (Serial Digital Interface). The image generation apparatus 201 receives images obtained by the plurality of the imaging apparatuses 104 performing image capturing through this line and stores them in a database.

The information processing apparatus 202 selects a virtual viewpoint image that is provided to the user terminal 203 from the virtual viewpoint image group generated by the image generation apparatus 201. In more detail, the information processing apparatus 202 determines the kind of virtual viewpoint information that is used for generation processing of a virtual viewpoint image to be output to the user terminal 203 based on device information (terminal information) specifying the user terminal 203. Then, the information processing apparatus 202 selects a virtual viewpoint image in accordance with the determined kind of virtual viewpoint information as the virtual viewpoint image that is output to the user terminal 203. As the user terminal 203, mention is made of, for example, a stationary display, a mobile terminal, such as a smartphone and a tablet terminal, and a viewing device of a virtual viewpoint image, such as a head-mounted display, a table-type display, and a projector. It is possible to classify the user terminal 203 into, for example, three types as follows in accordance with a viewing aspect of a user. As a first type, the user terminal 203 is classified as a display device in which a small-size display that displays an image corresponding to each of both eyes of a user is arranged at a position relatively close to the user and. which is suitable to display an image corresponding to a viewpoint corresponding to an object (person and the like) within a predetermined area of the field. For example, a head-mounted display or the like falls into this category. Because of this, data is stored in advance, in which information on a virtual viewpoint corresponding to the viewpoint position and the line-of-sight direction of a specific player within the predetermined area of the field is associated with the device information such as this. Alternatively, the device information and the information on a virtual viewpoint corresponding to the viewpoint position and the line-of-sight direction of a virtual person existing within the area of the field may be associated with each other. As the viewpoint of a virtual person, for example, the viewpoint position is set at the center of the field and at the height corresponding to the average height of a person from the ground surface of the field. Due to this, it is possible for a user to view an image that is obtained in a case where the user stands on the field that the user cannot enter actually. Not limited to the head-mounted display, it is possible to apply the setting method of a viewpoint position described above also to another wearable device that displays a virtual viewpoint image corresponding to the eye of a user, such as a glass-type display and a device in which a display is provided for only one eye.

As a second type, the user terminal 203 is classified as a display device in which a display unit configured to display an image is arranged on its side, which is arranged at a position relatively far from a user, and which is suitable to display an image corresponding to the viewpoint position and the line-of-sight direction in a case where a target player is observed from the periphery within the predetermined area of the field. The case where the display unit is arranged on its side may be, for example, a case of a state where the angle of the display screen with respect to the horizontal plane is larger than a predetermined threshold value with a state where the display screen is parallel to the horizontal plane being taken to be an angle of 0 degrees. For example, a stationary display, a projector and the like fall into this category. Further, in a case where detection information indicating that the display unit is in the transverse direction is attached to the device information, a mobile terminal, such as a smartphone and a tablet terminal, falls into this category as well. Because of this, data is stored in advance, in which information on a virtual viewpoint corresponding to the viewpoint position and the line-of-sight direction in a case where a target player is observed from the periphery within the predetermined area of the field is associated with the device information such as this.

As a third type, the user terminal 203 is classified as a display device in which a display unit configured to display an image is arranged faceup, which is arranged at a position from which a user can look down, and which is suitable to display an image corresponding to the viewpoint position and the line-of-sight direction in a case where part or all of the predetermined area of the field is viewed from a bird's eye. The case where the display unit is arranged faceup may be, for example, a case of a state where the angle of the display screen with respect to the horizontal plane is smaller than a predetermined threshold value with a state where the display screen is parallel to the horizontal plane being taken to be an angle of 0 degrees, For example, a table-type display and the like fall into this category. Further, in a case where detection information indicating that the display unit is in the upward direction is attached to the device information, a mobile terminal, such as a smartphone and a tablet terminal, tails into this category as well, Because of this, data is stored in advance, in which information on a virtual viewpoint corresponding to the viewpoint position and the line-of-sight direction in a case where part or all of the predetermined area of the field is viewed from a bird's eye is associated with the device information such as this.

In the example described above, although it is assumed that both the virtual viewpoint position and the line-of-sight direction from the virtual viewpoint are determined in accordance with the device information, this is not limited. The information processing apparatus 202 may be configured to determine at least the virtual viewpoint position.

Further, in a case where the user terminal 203 is a smartphone or a tablet terminal, the configuration may be one in which orientation information on the device based on a sensitive sensor or the like is obtained as the device information. In this case, for example, the configuration may be one in which the virtual viewpoint position corresponding to a specific object is determined on a condition that it is specified by the orientation information that is obtained that the angle of the display screen of the device with respect to the horizontal plane is larger than a predetermined threshold value. Further, for example, the configuration may be one in which the virtual viewpoint position from which part or all of the predetermined area of the field is viewed from a bird's eye is determined on a condition that it is determined by the orientation information that is obtained that the angle of the display screen of the device with respect to the horizontal plane is smaller than a predetermined threshold value.

The virtual viewpoint information is information that is input from the user terminal 203 and information including the virtual viewpoint position and line-of-sight direction (orientation) used for generation processing of a virtual viewpoint image to be output to the user terminal 203.

Upon receipt of device information from the user terminal 203, the information processing apparatus 202 determines the kind of the user terminal 203 based on the device information and determines the virtual viewpoint information associated in advance with the kind of the user terminal 203 based on the determination results. Then, the information processing apparatus 202 outputs the virtual viewpoint image corresponding to the determined virtual viewpoint information to the user terminal 203. That is, the information processing apparatus 202 determines the virtual viewpoint information of the kind corresponding to the virtual viewpoint image that is considered to be the optimum image for a user at the time of displaying the image on the user terminal. Then, the information processing apparatus 202 selects the virtual viewpoint image in accordance with the virtual viewpoint information of the determined kind from the virtual viewpoint image group obtained from the image generation apparatus 201. Upon receipt of the operation instructions to start reproduction of the virtual viewpoint image from the user terminal 203, the information processing apparatus 202 transmits (outputs) the virtual viewpoint image selected based on the virtual viewpoint information of the determined kind to the user terminal 203.

The information processing apparatus 202 in the present embodiment stores in advance a plurality of pieces of virtual viewpoint information corresponding to different kinds of device and determines the appropriate virtual viewpoint information in accordance with the kind of the user terminal 203 determined based on the obtained device information. Note that, this is not limited. For example, in a case where it is determined in advance that the information processing apparatus 202 causes a specific kind of device to display the virtual viewpoint image, it is not necessary to store a plurality of pieces of virtual viewpoint information. In this case, the information processing apparatus 202 checks whether the user terminal 203 that is caused to display the virtual viewpoint image is the specific kind of device based on the obtained device information and in a case where it is checked, the information processing apparatus 202 causes the user terminal 203 to display the virtual viewpoint image corresponding to the virtual viewpoint information stored in advance.

Further, it may also be possible for the information processing apparatus 202 to cause the user terminal 203 to display the virtual viewpoint image corresponding to the default virtual viewpoint in a case where the user terminal 203 is not the kind of device associated with the virtual viewpoint information stored in advance. As the default virtual viewpoint, it may also be possible to set in advance the viewpoint from which the field is viewed side-on, and the like. Further, the configuration may be one in which in a case where the user terminal 203 is not the kind of device associated with the virtual viewpoint information stored in advance, arbitrary virtual viewpoint information is determined from the virtual viewpoint information stored in advance.

As a supplement, the information processing apparatus 202 is, for example, a personal computer or the like. Part or all of the functions of the information processing apparatus 202 may be incorporated in the image generation apparatus 201 or may be incorporated in the user terminal 203, or vice versa. That is, for example, part or all of the functions of the image generation apparatus 201 may be incorporated in the information processing apparatus 202. For example, the configuration may be one in which the information processing apparatus 202 generates a virtual viewpoint image. As described above, the information processing apparatus 202 and the image generation apparatus 201 may be one integrated apparatus or the information processing apparatus 202 and the user terminal 203 may be one integrated apparatus. Further, arbitrary functions of the functions of the image generation apparatus 201, the information processing apparatus 202, and the user terminal 203 in the present embodiment may be performed by one apparatus.

The user terminal 203 is an information processing apparatus that a user making use of the image processing system 100 operates. The user terminal 203 receives the operation instructions to, for example, move the virtual viewpoint position, change the orientation of the virtual viewpoint (line-of-sight direction of the virtual viewpoint), switch the viewpoint to another, and so on, based on the user input. Upon receipt of the operation instructions from a user, the user terminal 203 generates a transmission signal relating to information including virtual viewpoint parameters indicating the contents of the received operation instructions and transmits the generated transmission signal to the information processing apparatus 202. It is assumed that the virtual viewpoint parameters in the present embodiment include time information, virtual viewpoint position information, and orientation information. Note that the information included in the virtual viewpoint parameters is not limited to this and for example, viewing angle information corresponding to the extent (viewing angle) of the field of view of the virtual viewpoint may be further included. Further, the configuration may be one in which the virtual viewpoint parameters include arbitrary information of the time information, position information, orientation information, and viewing angle information.

The virtual viewpoint parameters in the present embodiment are explained by using the drawing. FIG. 6 is a diagram showing a configuration example of the virtual viewpoint parameters. Time information consists of HH (hour), MM (minute), SS (second), and FF (frame). Position information may be indicated by three-dimensional orthogonal coordinates in a coordinate system in which three coordinate axes (x-axis, y-axis, z-axis) intersect at the origin. The origin at this time is, for example, the center of the center circle of the field 103, or the like, and may be an arbitrary position within the image capturing space. Orientation information may be indicated by three angles formed by three axes of pan (horizontal direction), tilt (vertical direction), and roll (direction in which the imaging apparatus rotates). Further, it is possible for the user terminal 203 to receive the virtual viewpoint image from the information processing apparatus 202 and display the received virtual viewpoint image on the display unit of the built-in display device (external display device as the case may be).

The user terminal 203 is a terminal device and a viewing device of a virtual viewpoint image. For example, there is a mobile terminal, such as a personal computer, a smartphone, or a tablet terminal, and also there is a head-mounted display, a table-type display, a stationary display, or a projector. The user terminal 203 has an interface for receiving the user operation of at least one of a mouse, a keyboard, a six-axis controller, a touch panel and the like. Further, the user terminal 203 has terminal information (device information) for identifying the terminal device and the connected device that is connected to the terminal device. The user terminal 203 transmits the terminal information on its own terminal to the information processing apparatus 202 in a case where the user terminal 203 is connected with the information processing apparatus 202. Here, the configuration of terminal information is explained by using the drawing. FIG. 7 is a diagram showing a configuration example of terminal information. The terminal information includes the terminal device name and the terminal device ID indicating the identification code corresponding to the terminal device name. The terminal device name is an arbitrary name. The terminal device ID is the identification code uniquely identifying the kind of viewing device and includes alphabet and figures, and is an identification symbol allocated for distinguishing (identifying) each device. In the example in FIG. 7, for the terminal device name "Head-Mounted Display", "HMD123456" is set as the terminal device ID.

The image generation apparatus 201, the information processing apparatus 202, and the user terminal 203 are configured so that transmission and reception of information are enabled with one another via, a network, for example, such as the internet. The communication between apparatuses may be performed by one of wireless communication and wired communication, or a combination thereof.

(Hardware Configuration of Apparatus)

Figure 3:
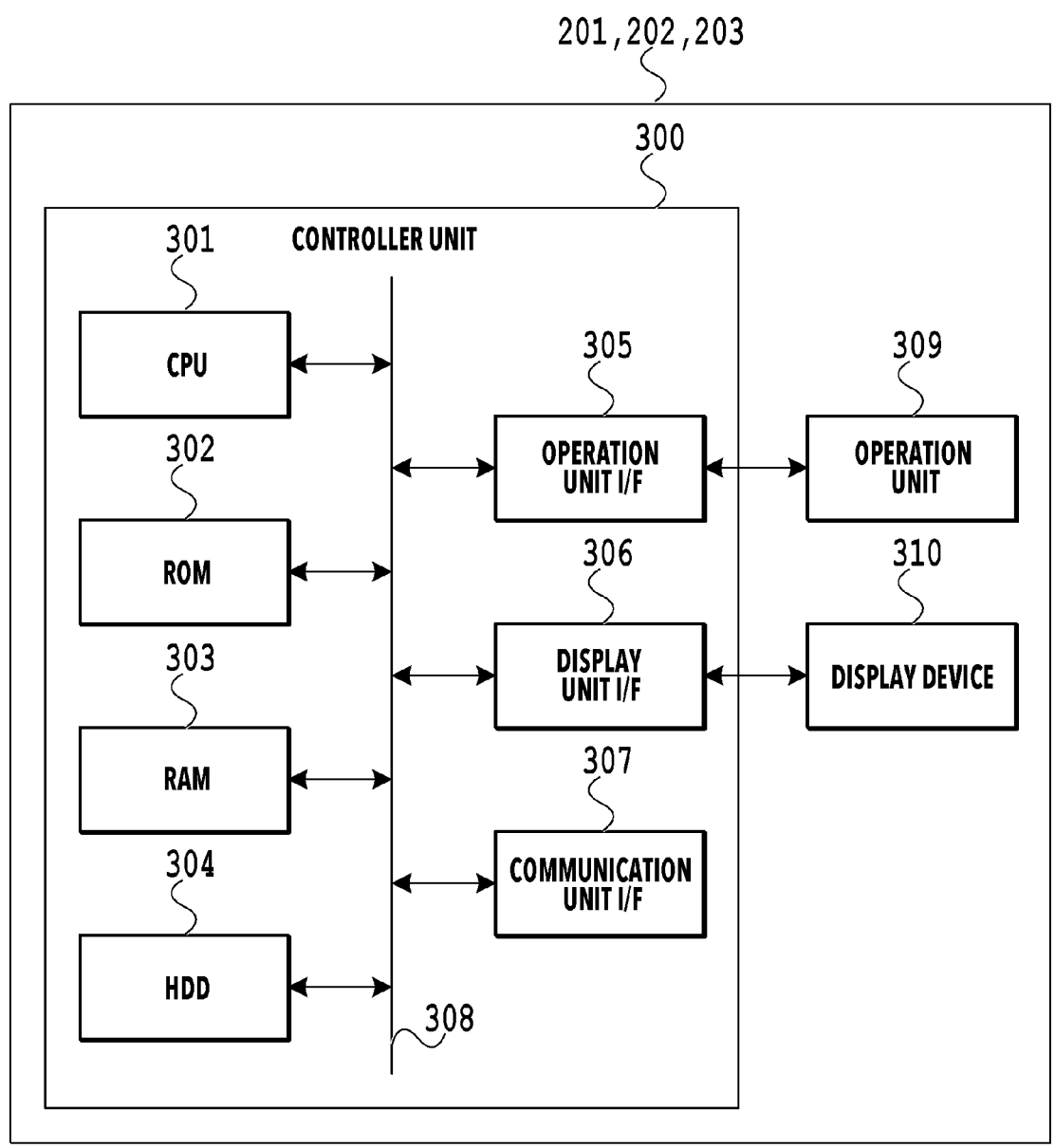
FIG. 3 is a diagram showing a hardware configuration example of each apparatus.

Following the above, a hardware configuration example of each of the apparatuses described above is explained by using the drawing. FIG. 3 is a diagram showing a hardware configuration example of the image generation apparatus 201, the information processing apparatus 202, and the user terminal 203. Each apparatus has a common hardware configuration and has a controller unit 300, an operation unit 309, and a display device 310.

The controller unit 300 has a CPU 301, a ROM 302, a RAM 303, an HDD 304, an operation unit I/F (interface) 305, a display unit I/F 306, and a communication I/F 307. Further, these are connected to one another via a system bus 308.

The CPU (Central Processing Unit) 301 controls the operation of the ROM 302, the RAM 303, the HDD 304, the operation I/F 305, the display unit I/F 306, and the communication I/F 307 via the system bus 308. The CPU 301 activates the OS (Operating System) by a boat program stored in the ROM (Read Only Memory) 302. The CPU 301 executes application programs stored in, for example, the HDD (Hard Disk Drive) 304 on the activated OS. By the CPU 301 executing the application programs, various kinds of processing of each apparatus are implemented. The RAM (Random Access Memory) 303 is used as a temporary storage area, such as a main memory and a work area, of the CPU 301. The HDD 304 stores the application programs as described above. Further, the CPU 301 may be configured by one processor or by a plurality of processors.

The operation unit I/F 305 is an interface with the operation unit 309. The operation unit I/F 305 sends out the information that is input by a user via the operation unit 309 to the CPU 301. The operation unit 309 has a device capable of receiving the user operation, for example, such as a mouse, a keyboard, and a touch panel. The display unit I/F 306 is an interface with the display device 310. The display unit I/F 306 outputs, for example, the image data to be displayed on the display device 310 to the display device 310. The display device 310 has a display, such as a liquid crystal display.

The communication I/F 307 is an interface for performing communication, for example, such as Ethernet (registered trademark). The communication I/F 307 is connected to a transmission cable and includes a connector and the like for receiving the connection of the transmission cable. The communication I/F 307 performs input and output of information with an external device via the transmission cable. The communication I/F 307 may be, for example, a circuit that performs wireless communication, such as a baseband circuit and an RF circuit, or an antenna. Further, it is also possible for the controller unit 300 to perform display control that causes the external display device 310 connected via the cable or the network to display an image. In this case, the controller unit 300 implements the display control by outputting display data to the external display device 310. The configuration in FIG. 3 is an example and part thereof may be omitted, or a configuration that is not shown schematically may be added, or the configuration shown schematically may be combined. For example, it may also be possible for the image generation apparatus 201 not to have the display device 310.

As above, although the hardware configuration of the image generation apparatus 201, the information processing apparatus 202, and the user terminal 203 is explained by using FIG. 3. each of the configurations shown in FIG. 3 is not an indispensable configuration. Further, in the above-described explanation, although explanation is given by assuming that the controller unit 300 has the CPU 301, explanation is not necessarily limited to this. For example, it may also be possible for the controller unit 300 to have hardware, such as an ASIC (Application Specific Integrated Circuit), a DSP, and an FPGA, in place of the CPU 301 or in addition to the CPU 301. It may also be possible for hardware, such as an ASIC, a DSP (Digital Signal Processor), and an FPGA (Field Programmable Gate Array), to perform part or all of the processing that is performed by the CPU 301.

(Function Configuration of Image Generation Apparatus)

Figure 4:
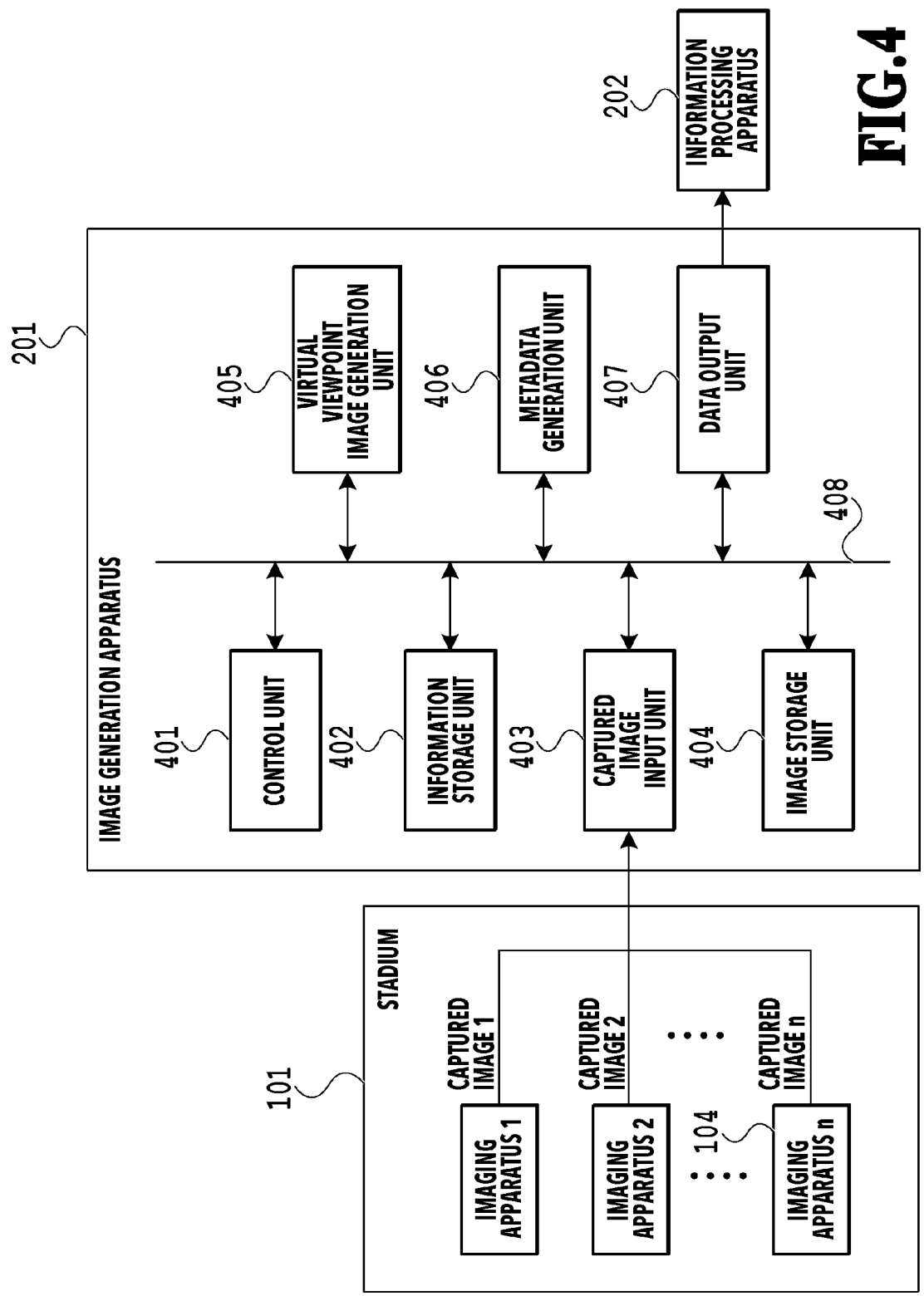
FIG. 4 is a diagram showing a function configuration example of an image generation apparatus.

The function configuration of the image generation apparatus is explained by using the drawing. FIG. 4 is a block diagram showing a function configuration example of the image generation apparatus 201. Each function shown in FIG. 4 is implemented by, for example, the CPU 301 of the image generation apparatus 201 reading various programs stored in the ROM 302 and performing the control of each unit. Further, it may also be possible to implement part or all of the configurations shown in FIG. 4 by dedicated hardware, such as an ASIC and an FPGA.

As shown in FIG. 4, the image generation apparatus 201 has a control unit 401, an information storage unit 402, a captured image input unit 403, an image storage unit 404, a virtual viewpoint image generation unit 405, a metadata generation unit 406, and a data output unit 407. Further, these are connected to one another by an internal bus 408 and it is possible to perform transmission and reception of data with one another under the control of the control unit 401.

The control unit 401 controls the operation of the entire image generation apparatus 201 in accordance with computer programs stored in the information storage unit 402. The information storage unit 402 includes a nonvolatile memory and stores programs (for example, computer programs for controlling the operation of the entire image generation apparatus 201, and the like) and information, such as various kinds of data.

The captured image input unit 403 obtains images obtained by the plurality of the imaging apparatuses 104 installed in the stadium 101 performing image capturing at a predetermined frame rate and outputs the images to the image storage unit 404. The captured image input unit 403 obtains captured images from the imaging apparatus 104 by a wired or wireless communication module, or an image transmission module, such as an SDI.

The image storage unit 404 is a large-capacity storage device, for example, such as a magnetic disc, an optical disc, and a semiconductor memory. The image storage unit 404 stores captured images obtained by the captured image input unit 403, a virtual viewpoint image group generated based on those captured images, and metadata indicating the position of an object. It may also be possible to provide the image storage unit 404 physically outside the image generation apparatus 201. Further, the captured images stored in the image storage unit 404 and the virtual viewpoint image group generated based on those captured images are stored, for example, in the MXF (Material eXchange Format) format or the like as the image format. In addition, the captured images stored in the image storage unit 404 and the virtual viewpoint image group generated based on those captured images are compressed in, for example, the MPEG2 format or the like. Note that the data format is not necessarily limited to those.

The virtual viewpoint image generation unit 405 generates a virtual viewpoint image group based on a plurality of captured images stored in the image storage unit 404. As the method of generating a virtual viewpoint image group, mention is made of, for example, a method that uses image-based rendering. The image-based rendering is a rendering method of generating a virtual viewpoint image based on captured images obtained by performing image capturing from a plurality of actual viewpoints without performing the modeling process (that is, process to create the shape of an object by using a geometrical figure).

The method of generating a virtual viewpoint image group is not limited to the image-based rendering and model-based rendering (MBR) may be used. Here, the MBR is a rendering method of generating a virtual viewpoint image by using a three-dimensional model that is generated based on a plurality of captured images obtained by performing image capturing of an object from a plurality of directions. Specifically, the MBR is a rendering method of generating an appearance of a target scene from the virtual viewpoint as an image by using the three-dimensional shape (model) of the target scene, which is obtained by the three-dimensional shape restoration method. As the three-dimensional shape restoration method, mention is made of, for example, the visual hull method (shape-from-silhouette method), Multi-View-Stereo (MVS) and the like.

The virtual viewpoint image group that is generated includes virtual viewpoint images of a variety of virtual viewpoints, line-of-sight directions, and gaze points and in the present embodiment, it is assumed that the virtual viewpoint image group such as that is compression-coded in the spatial direction and the time direction as one image stream. Note that in other embodiments, the virtual viewpoint image group may include a plurality of images independent of one another in place of one image stream. Alternatively, the virtual viewpoint image group may not be compression-coded.

Further, it may also be possible for the image generation apparatus 201 to generate, for example, information indicating a three-dimensional model and information for generating a virtual viewpoint image, such as an image that is mapped into the three-dimensional model, in place of the virtual viewpoint image group. That is, it may also be possible for the virtual viewpoint image generation unit 405 to generate information necessary for rendering a virtual viewpoint image in the information processing apparatus 202 or the user terminal 203 in place of generating a rendered virtual viewpoint image.

The metadata generation unit 406 analyzes the captured image stored in the image storage unit 404 and obtains position information on a specific object. Obtainment of position information on a specific object is performed for every time from the start of image capturing of the captured image stored in the image storage unit 404 until the end of the image capturing. The specific object is a person, such as a specific player and a referee, or a ball or the like. The metadata generation unit 406 generates metadata including the obtained position information on the specific object and outputs the generated metadata to the virtual viewpoint image generation unit 405.

Here, a configuration example of metadata is explained by using the drawing. FIG. 8 is a diagram showing a configuration example of metadata. Metadata includes, for example, Time Information 801 and Position Information 802. Time Information 801 consists of HH (hour), MM (minute), SS (second), and FF (frame). Position information 802 indicates the position of a specific object and is represented by using three-dimensional orthogonal coordinates. As the specific object, mention is made of, for example, a ball, a player, a referee and the like. In the example in FIG. 8. the specific object includes Ball, Player 01, Player 02, and Player 03. The object name has an arbitrary name and an object ID indicating an identification code, The object ID is represented by alphabet and figures and is an identification symbol allocated to each object so that each object can be identified. The metadata is not limited to that obtained by the analysis of the captured image by the metadata generation unit 406 and may be that registered in advance in the image generation apparatus 201 or the information processing apparatus 202.

The data output unit 407 outputs the virtual viewpoint image group that is stored in the image storage unit 404 to the information processing apparatus 202 at a predetermined frame rate. Further, the data output unit 407 outputs the metadata that is stored in the image storage unit 404 to the information processing apparatus 202 along with the virtual viewpoint image group.

(Function Configuration of Information Processing Apparatus)

Figure 5:
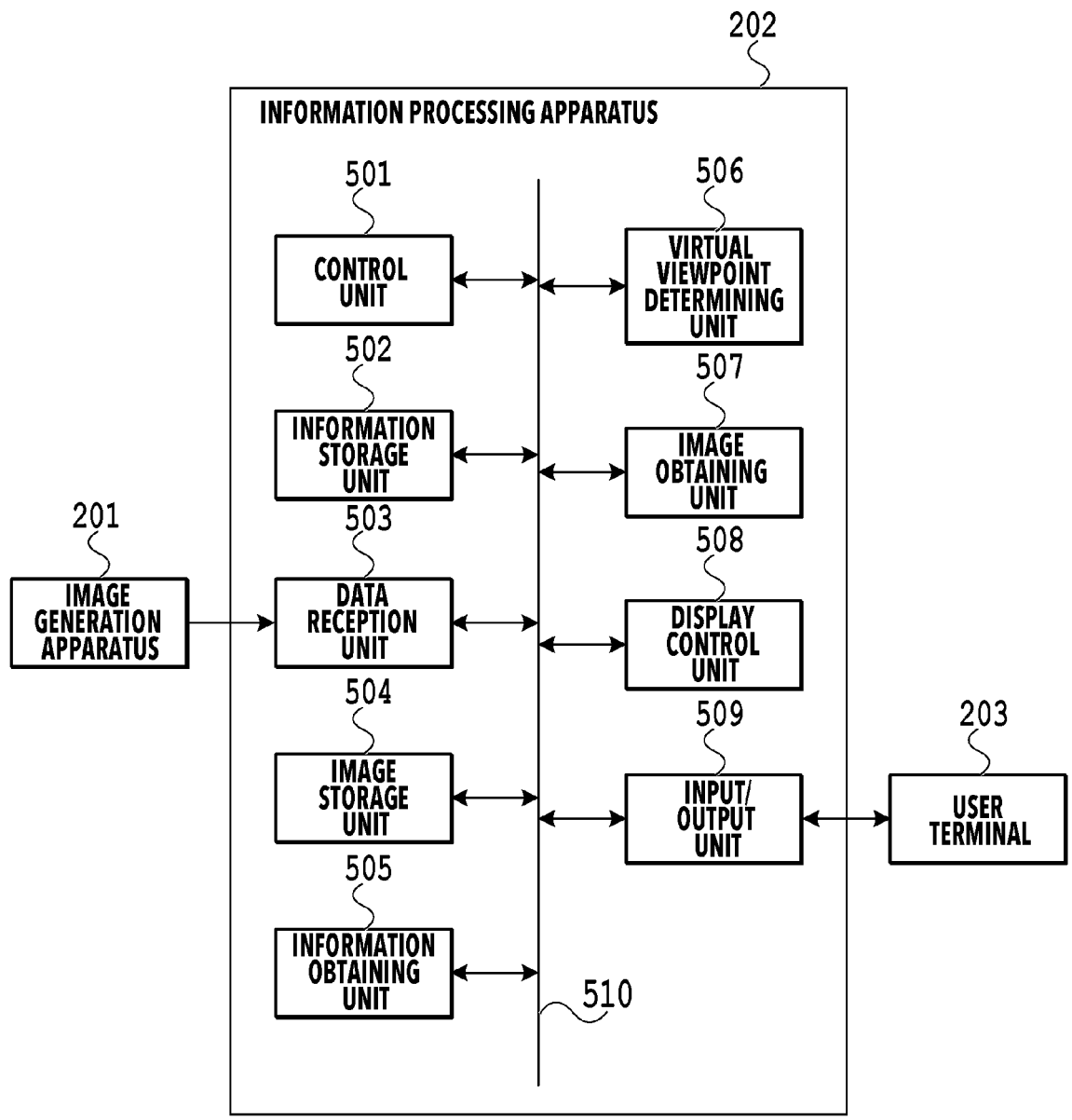
FIG. 5 is a diagram showing a function configuration example of an information processing apparatus.

The function configuration of the information processing apparatus is explained by using the drawing. FIG. 5 is a block diagram showing a function configuration example of the information processing apparatus 202. Each function shown in FIG. 5 is implemented by, for example, the CPU 301 of the information processing apparatus 202 reading various programs stored in the ROM 302 and performing control of each unit. Further, it may also be possible to implement part or all of the configurations shown in FIG. 5 by dedicated hardware, such as an ASIC and an FPGA.

As shown in FIG. 5, the information processing apparatus 202 has a control unit 501, an information storage unit 502, a data reception unit 503, an image storage unit 504, an information obtaining unit 505, a virtual viewpoint determining unit 506, an image obtaining unit 507, a display control unit 508, and an input/output unit 509. Further, these are connected to one another by an internal bus 510 and it is possible to perform transmission and reception of data with one another under the control of the control unit 501.

The control unit 501 controls the operation of the entire information processing apparatus 202 in accordance with computer programs stored in the information storage unit 502. The information storage unit 502 includes a nonvolatile memory and stores programs (for example, computer programs for controlling the operation of the entire information processing apparatus 202, and the like) and various kinds of data. The data reception unit 503 receives a virtual viewpoint image group and metadata from the image generation apparatus 201 and outputs them to the image storage unit 504.

The image storage unit 504 is, for example, a large-capacity storage device, such as a magnetic disc, an optical disc, and a semiconductor memory. The image storage unit 504 stores the virtual viewpoint image group and metadata obtained by the data reception unit 503, a virtual viewpoint parameter group and terminal information obtained by the input/output unit 509, and object dimension information obtained by the information obtaining unit 505. The virtual viewpoint parameter group is a set of virtual viewpoint parameters. It may also be possible to provide the image storage unit 504 physically outside the information processing apparatus 202.

Figure 9:
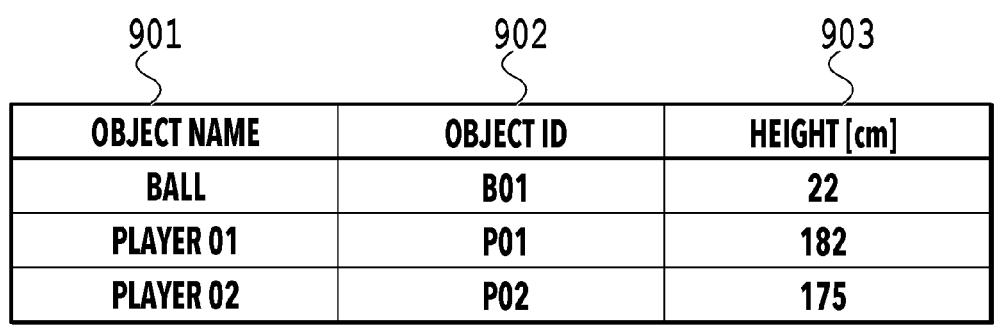
FIG. 9 is a diagram showing an object dimension information example.

The information obtaining unit 505 obtains object dimension information from an external database (not shown schematically) in which the object dimension information obtained by measuring the dimension (size) of a specific object is stored in advance. Here, the object dimension information is explained by using the drawing, FIG. 9 is a diagram showing a configuration example of object dimension information. The object dimension information is object information indicating the size of an object existing in a captured image and includes Object Name 901, Object ID 902, and Height 903. Object Name 901 is an arbitrary name. Object ID 902 is represented by alphabet and figures and is an identification code indicated by an identification symbol allocated to each object so that each object can be identified. Height 903 is a numerical value indicating the length in the height direction of an object (size in the vertical direction). Here, although it is assumed that the height is represented by a numerical value in units of centimeters, the height is not limited to that which is represented by a numerical value in units of centimeters.

Upon receipt of operation instructions to start a display of the virtual viewpoint image from the user terminal 203, the virtual viewpoint determining unit 506 obtains terminal information from the image storage unit 504 and determines the kind of virtual viewpoint information indicating at least the virtual viewpoint position and orientation based on the obtained terminal information. In the processing by the virtual viewpoint determining unit 506, at least one or more kinds of virtual viewpoint information are determined.

Figure 10A:
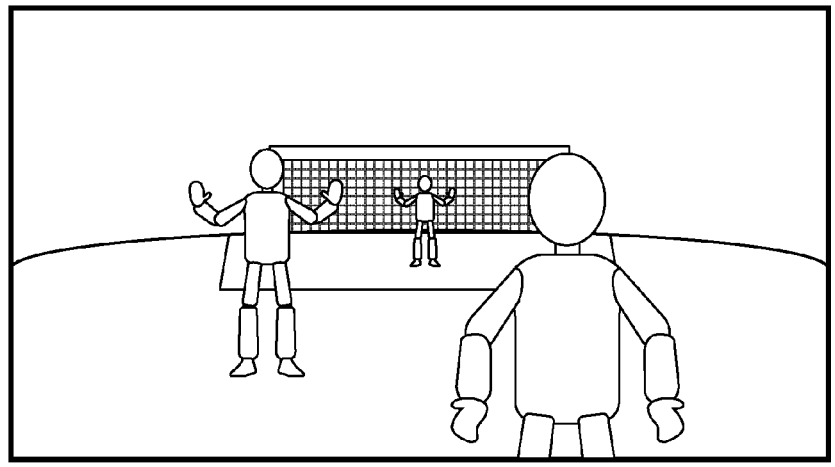
FIG. 10A to FIG. 10C are each a diagram showing a viewpoint example determined by a virtual viewpoint determining unit.
Figure 10B:
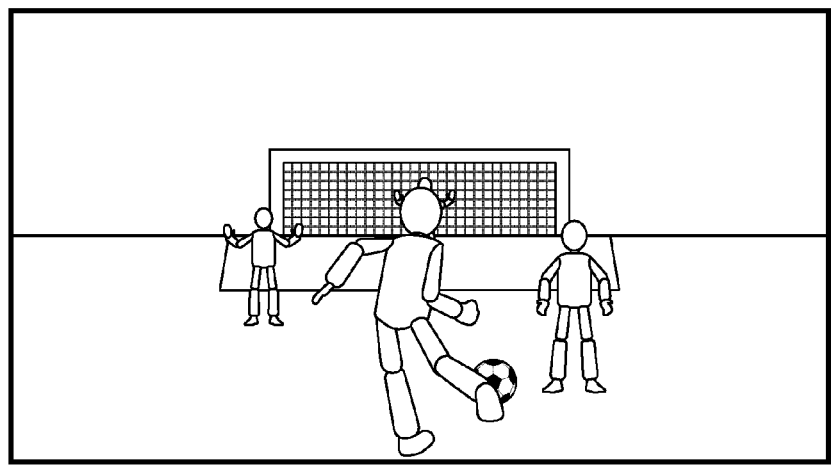
Figure 10C:
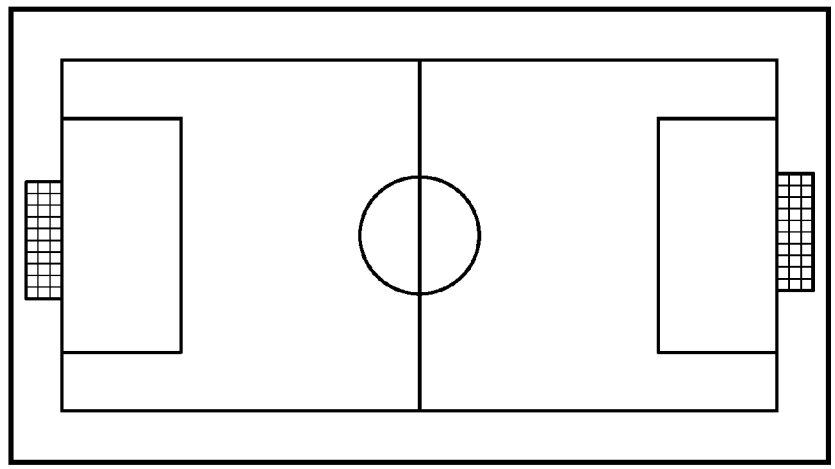

Here, the relationship between the terminal device ID of the terminal information and the kind of virtual viewpoint information that is determined is explained by using the drawings, FIG. 10A to FIG. 10C are each a diagram explaining the kind of virtual viewpoint information that is determined by the virtual viewpoint determining unit 506. FIG. 10A shows a virtual viewpoint image example in a case where a player viewpoint is determined as the virtual viewpoint indicated by the specific kind of virtual viewpoint information. FIG. 10B shows a virtual viewpoint image example in a case where a player observing viewpoint is determined as the virtual viewpoint indicated by the specific kind of virtual viewpoint information. FIG. 10C shows a virtual viewpoint image example in a case where a bird's eye viewpoint is determined as the virtual viewpoint indicated by the specific kind of virtual viewpoint information.

In a case where the terminal device ID of the terminal information obtained from the image storage unit 504 is a head-mounted display, the virtual viewpoint determining unit 506 determines the viewpoint from an arbitrary object (in the example in FIG. 10A, the viewpoint of a specific player) as the specific kind of virtual viewpoint. The object at this time is, for example, a player, a referee, a ball and the like. The configuration may be one in which it is possible to select the viewpoint of a virtual person who does not exist on the field, which is different from the object, as the virtual viewpoint. The object may be selected via the user terminal 203 or the object may already be registered in advance in the user terminal 203 and a favorite player or the like of a user may be selected automatically. Further, the object may be selected automatically by the virtual viewpoint determining unit 506. As the object that is selected automatically, for example, a player who holds a ball or a player located in the vicinity of the ball may be selected by the virtual viewpoint determining unit 506 based on the position information included in the metadata. The virtual viewpoint determining unit 506 specifies the position and movement direction of the selected object from the metadata and determines the virtual viewpoint position and orientation (line-of-sight direction). The orientation is found from the direction in which the object moves within a predetermined period of time. Further, the virtual viewpoint determining unit 506 specifies the height of the selected object from the object dimension information and determines the virtual viewpoint position (three-dimensional coordinates) including the height. It is desirable to set the height of the virtual viewpoint to a numerical value somewhat smaller than the height of the object dimension information so that the height is closer to the viewpoint of the object. Further, although the virtual viewpoint determining unit 506 determines the height by using the object dimension information, this is not limited and the height may be a certain height determined in advance.

In a case where the terminal device ID of the terminal information obtained from the image storage unit 504 is a stationary display, the virtual viewpoint determining unit 506 determines the player observing viewpoint (in the example in FIG. 10A, the viewpoint from which an arbitrary object is observed from behind) as the specific kind of virtual viewpoint. The selection of the observation-target object is the same as in the case where the terminal device ID is a head-mounted display. The virtual viewpoint determining unit 506 specifies the position and movement direction of the selected object from the metadata. The movement direction is found from the direction in which the object moves within a predetermined period of time. The virtual viewpoint determining unit 506 determines the position a predetermined distance apart from the reference, which is the position of the object, in the opposite direction of the movement direction as the virtual viewpoint position. Further, the virtual viewpoint determining unit 506 specifies the height of the selected object based on the object dimension information and determines the virtual viewpoint position (three-dimensional coordinates) including the height. It is desirable to set the height of the virtual viewpoint to a numerical value somewhat larger than the height of the object dimension information. Further, the virtual viewpoint determining unit 506 determines the orientation of the virtual viewpoint so that the line-of-sight of the virtual viewpoint faces from the virtual viewpoint position to the position of the object. Although the virtual viewpoint determining unit 506 determines the height by using the object dimension information, this is not limited and the height may be a certain height determined in advance.

In a case where the terminal device ID of the terminal information obtained. from the image storage unit 504 is a table-type display, the virtual viewpoint determining unit 506 determines the viewpoint from which the image capturing range is viewed from a bird's eye directly above as shown in FIG. 10C as the specific kind of virtual viewpoint. The virtual viewpoint determining unit 506 determines the orientation of the virtual viewpoint so that the virtual viewpoint faces directly below. Further, the virtual viewpoint determining unit 506 raises the virtual viewpoint from, for example, the center of the center circle of the soccer field vertically upward and determines the position from which the entire soccer field is the image capturing range as the virtual viewpoint position. Although the bird's eye viewpoint from directly above is illustrated as the birds eye viewpoint, this is not limited and any viewpoint may be accepted as long as it is possible to view the entire image capturing range from that viewpoint.

The image obtaining unit 507 selects the virtual viewpoint image from the virtual viewpoint image group obtained from the image storage unit 504 based on the virtual viewpoint position and orientation obtained from the virtual viewpoint determining unit 506. It may also be possible for the image obtaining unit 507 to select the virtual viewpoint image from the virtual viewpoint image group based on the virtual viewpoint parameters obtained via the input/output unit 509. The image obtaining unit 507 transmits the selected virtual viewpoint image to the display control unit 508.

Upon receipt of operation instructions to start a display of the virtual viewpoint image from the user terminal 203, the display control unit 508 performs control so that the virtual viewpoint image generated based on the virtual viewpoint position and orientation determined by the virtual viewpoint determining unit 506 is displayed on the user terminal 203.

The input/output unit .509 outputs the virtual viewpoint image obtained from the display control unit 508 to the user terminal 203. Further, the input/output unit 509 receives inputs of the operation instructions, the virtual viewpoint parameters, and the terminal information from the user terminal 203.

Figure 11:
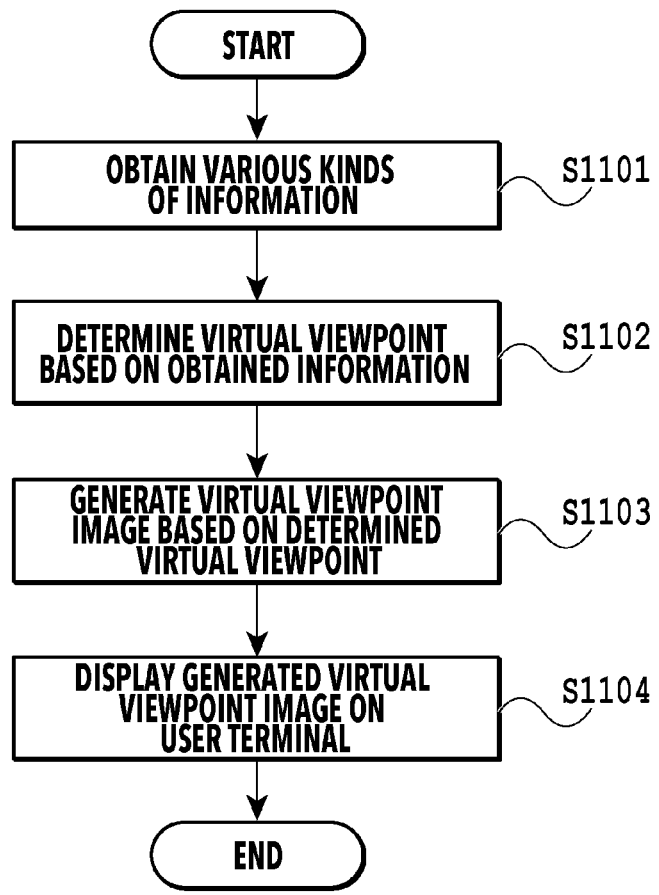
FIG. 11 is a flowchart showing a flow of processing performed by the information processing apparatus.

Following the above, a flow of processing performed by the information processing apparatus is explained by using the drawing. FIG. 11 is a flowchart showing a flow of processing performed by the information processing apparatus 202. S indicates a step.

At S1101, the information processing apparatus 202 obtains various kinds of information.

At S1102, the information processing apparatus 202 determines the kind of virtual viewpoint information based on the device information, which is the information obtained at S1101.

At S1103, the information processing apparatus 202 selects a virtual viewpoint image based on the kind of virtual viewpoint information determined at S1102. Specifically, the information processing apparatus 202 selects the virtual viewpoint image in accordance with the determined kind of virtual viewpoint information from a plurality of kinds of virtual viewpoint image.

At S1104, the information processing apparatus 202 outputs the virtual viewpoint image generated at S1103 to the user terminal 203 and performs control that causes the user terminal 203 to display the virtual viewpoint image.

As explained above, it is possible to determine the kind of virtual viewpoint information including at least the virtual viewpoint position and orientation based on the device information indicating the type of the user terminal 203, generate the virtual viewpoint image in accordance with the determined kind of virtual viewpoint information, and perform control to display the virtual viewpoint image on the user terminal 203. Consequently, it is possible to automatically display a virtual viewpoint image suitable to the user terminal 203 only by a user performing the operation to reproduce the virtual viewpoint image for the user terminal 203. Due to this, it is not necessary to perform the operation to select the kind of virtual viewpoint information and it is possible to reduce the load of the user operation.

(Other Embodiments)

In the above-described embodiment, although the example is explained in which the virtual viewpoint determining unit 506 determines one kind of virtual viewpoint information based on the received device information, the example is not limited to this. For example, an example may be accepted in which the virtual viewpoint determining unit 506 determines a plurality of kinds of virtual viewpoint information as shown in FIG. 10A to FIG. 10C and then attaches priority to each virtual viewpoint based on the terminal device ID of the device information. The image obtaining unit 507 selects the virtual viewpoint image in accordance with the virtual viewpoint information from the virtual viewpoint image group obtained from the image storage unit 504 based on each kind of virtual viewpoint information determined by the virtual viewpoint determining unit 506. Upon receipt of the operation instructions to start a display of the virtual viewpoint image from the user terminal 203, the display control unit 508 performs control so that the virtual viewpoint image in accordance with the kind of virtual viewpoint information whose priority is the highest is displayed. Further, in a case where there is a request to switch the virtual viewpoint image to another kind of virtual viewpoint image (virtual viewpoint) from the user terminal 203, the display control unit 508 performs control so that the virtual viewpoint image in accordance with the kind of virtual viewpoint information whose priority is the second highest is displayed. By performing control in this manner, it is made possible to display the virtual viewpoint images in accordance with the virtual viewpoint information suitable to a viewing device in order from the virtual viewpoint image whose priority is the highest.

Figure 12:
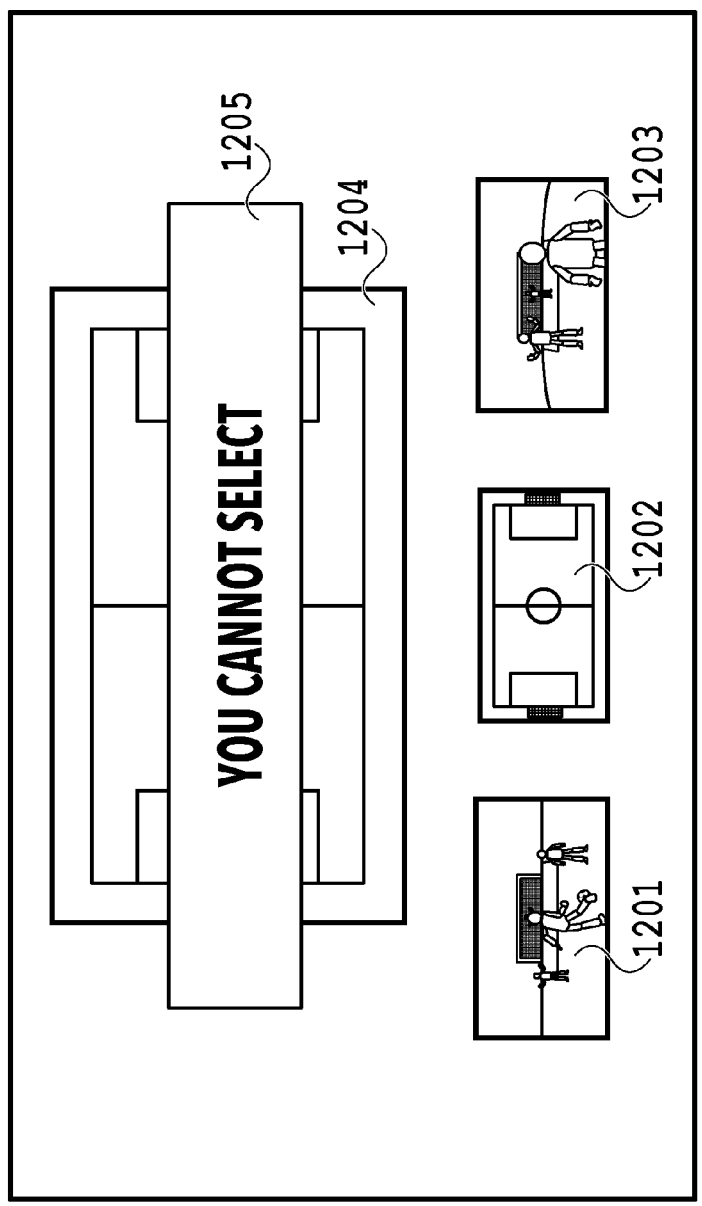
FIG. 12 is a diagram showing a thumbnail display example.

Further, although explanation is given on the assumption that the virtual viewpoint determining unit 506 attaches priority to each piece of virtual viewpoint information based on the terminal device ID of the device information after determining a plurality of kinds of virtual viewpoint information, the explanation is not limited to this. For example, the virtual viewpoint determining unit 506 may determine whether or not the virtual viewpoint information is a kind of virtual viewpoint information suitable to a viewing device based on the terminal device ID of the device information and attach the determination results to the virtual viewpoint information. The image obtaining unit 507 selects a virtual viewpoint image from the virtual viewpoint image group obtained from the image storage unit 504 based on each piece of virtual viewpoint information obtained from the virtual viewpoint determining unit 506. The display control unit 508 performs control so that the plurality of kinds of virtual viewpoint image obtained from the image obtaining unit 507 is displayed on the display unit of the user terminal 203 as a thumbnail. Here, the display of a thumbnail is explained by using the drawing. FIG. 12 is a diagram showing a thumbnail display example. As shown in FIG. 12, on the display unit of the user terminal 203, thumbnail images 1201, 1202, and 1203 are displayed. The thumbnail images 1201, 1202, and 1203 are each a reduced image of the virtual viewpoint image generated in accordance with the kind of virtual viewpoint information determined by the virtual viewpoint determining unit 506. A selected image 1204 is the virtual viewpoint image of the thumbnail image selected by a user from among a plurality of thumbnail images. The display control unit 508 performs control so that the selected image 1204 displays a warning based on the determination results attached to the virtual viewpoint image. In a case where the determination results are virtual viewpoint information corresponding to the virtual viewpoint image not suitable to the terminal device, the display control unit 508 displays a warning 1205 including a warning sentence, such as "You cannot select". By performing control in this manner, it is possible to prevent an inappropriate virtual viewpoint image from being reproduced (displayed) on the user terminal 203.

Further, in the above-described embodiment, although the case where a game of soccer is captured is illustrated, the image capturing target is not necessarily limited to this. For example, it is also possible to apply the present embodiment to image capturing of games of other sports, such as rugby, tennis, ice skating, and basketball, performances, such as a live performance and a concert, and the like. It is also possible to determine the viewpoint from which a specific artist is observed in a live performance, a concert, and the like as the virtual viewpoint, the viewpoint of a specific artist as the virtual viewpoint, and the viewpoint from which the stage on which a performance is being put on is viewed from a bird's eye as the virtual viewpoint.

Embodiment(s) of the present disclosure can also be realized by a computer of a system or apparatus that reads out and executes computer executable instructions (e.g., one or more programs) recorded on a storage medium (which may also be referred to more frilly as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to display a virtual viewpoint image suitable to a viewing device.

This application claims the benefit of Japanese Patent Application No. 2020-183778, filed Nov. 2, 2020, which is hereby incorporated by reference wherein in its entirety.

What is claimed is:

1. An information processing apparatus comprising:
one or more memories storing instructions; and
one or more processors executing the instructions to:
 obtain information to specify a display device that displays a virtual viewpoint image whose virtual viewpoint can be changed; and
 determine a virtual viewpoint position in accordance with a display device specified based on the information obtained, wherein
in a case where the obtained information is information to specify a display device whose angle of a display screen that displays the virtual viewpoint image with respect to a horizontal plane is larger than a threshold value, a virtual viewpoint position to observe a specific object within a predetermined area represented by the virtual viewpoint image is determined.

2. The information processing apparatus according to claim 1, wherein the instructions when executed by the processor further cause the information processing apparatus to:
further determines a view direction from the virtual viewpoint.

3. The information processing apparatus according to claim 1, wherein
in a case where the information is information for specifying a display device that displays the virtual viewpoint image corresponding to eyes of a user of the display device, a position corresponding to a viewpoint of a specific object within a predetermined area represented by the virtual viewpoint image, as the virtual viewpoint position is determined.

4. The information processing apparatus according to claim 3, wherein
the information includes information to specify a head-mounted display as the display device.

5. The information processing apparatus according to claim 1, wherein
the information includes information to specify at least one of a stationary display and a projector.

6. The information processing apparatus according to claim 1, wherein
in a case where the information is information for specifying a display device whose angle of a display screen that displays the virtual viewpoint image with respect to a horizontal plane is smaller than a threshold value, a position from which a predetermined area represented by the virtual viewpoint image is viewed from a bird's eye, as the virtual viewpoint position is determined.

7. The information processing apparatus according to claim 6, wherein
the information includes information for specifying a table-type display.

8. The information processing apparatus according to claim 1, wherein the instructions when executed by the processor further cause the information processing apparatus to:
determine a position determined in advance as the virtual viewpoint position in a case where a virtual viewpoint in accordance with a display device specified based on information does not exist.

9. The information processing apparatus according to claim 1, wherein the instructions when executed by the processor further cause the information processing apparatus to:
perform control to cause the display device to display a plurality of virtual viewpoint images corresponding to a plurality of virtual viewpoint positions in a thumbnail.

10. The information processing apparatus according to claim 1, wherein the instructions when executed by the processor further cause the information processing apparatus to:
determine the virtual viewpoint position by selecting a virtual viewpoint position whose priority is higher among a plurality of predetermined virtual viewpoint positions in accordance with the display device.

11. The information processing apparatus according to claim 1, wherein the instructions when executed by the processor further cause the information processing apparatus to:
generate a virtual viewpoint image based on the virtual viewpoint position.

12. An information processing apparatus comprising:
one or more memories storing instructions; and
one or more processors executing the instructions to:
 obtain information to specify a display device that displays a virtual viewpoint image whose virtual viewpoint can be changed; and
 determine a virtual viewpoint position in accordance with a display device specified based on the information, wherein
in a case where the orientation of the display device specified by the information is in a state where an angle of a display screen of the display device with respect to a horizontal plane is larger than a threshold value, a virtual viewpoint position to observe a specific object within a predetermined area represented by the virtual viewpoint image is determined.

13. The information processing apparatus according to claim 12, wherein
the display device is at least one of a tablet terminal and a smartphone.

14. An information processing apparatus comprising:
one or more memories storing instructions; and
one or more processors executing the instructions to:
 obtain information to specify a display device that displays a virtual viewpoint image whose virtual viewpoint can be changed; and
 determine a virtual viewpoint position in accordance with a display device specified based on the information, wherein
the information is information to specify an orientation of the display device; and
in a case where the orientation of the display device specified by the information is in a state where an angle of a display screen of the display device with respect to a horizontal plane is smaller than a threshold value, a virtual viewpoint position from which a predetermined area represented by the virtual viewpoint image is viewed from a bird's eye is determined.

15. A method for processing information using one or more processors functioning by executing instructions stored in one or more memories comprising the steps of:

obtaining information to specify a display device that displays a virtual viewpoint image whose virtual viewpoint can be changed; and determining a virtual viewpoint position in accordance with a display device specified based on the information obtained by the obtaining step, wherein in a case where the information obtained by the obtaining step is information for specifying a display device whose angle of a display screen that displays the virtual viewpoint image with respect to a horizontal plane is larger than a predetermined threshold value, the determining step determines a virtual viewpoint position to observe a specific object within a predetermined area represented by the virtual viewpoint image.

16. A method for processing information using one or more processors functioning by executing instructions stored in one or more memories comprising the steps of:

obtaining information to specify a display device that displays a virtual viewpoint image whose virtual viewpoint can be changed; and determining a virtual viewpoint position in accordance with a display device specified based on the information obtained by the obtaining step, wherein in a case where the orientation of the display device specified by the information is in a state where an angle of a display screen of the display device with respect to a horizontal plane is larger than a threshold value, the determining step determines a virtual viewpoint position to observe a specific object within a predetermined area represented by the virtual viewpoint image.

17. A method for processing information using one or more processors functioning by executing instructions stored in one or more memories comprising the steps of:

obtaining information to specify a display device that displays a virtual viewpoint image whose virtual viewpoint can be changed; and determining a virtual viewpoint position in accordance with a display device specified based on the information obtained by the obtaining step, wherein the information obtained by the obtaining step is information to specify an orientation of the display device, and in a case where the orientation of the display device specified by the information is in a state where an angle of a display screen of the display device with respect to a horizontal plane is smaller than a threshold value, the determining step determines a virtual viewpoint position from which a predetermined area represented by the virtual viewpoint image is viewed from a bird's eye perspective.

* * * * *